US012650216B1

(12) United States Patent
Lu

(10) Patent No.: US 12,650,216 B1
(45) Date of Patent: Jun. 9, 2026

(54) LUMINAIRE WITH DETACHABLE DECORATIVE PARTS

(71) Applicant: Zhongshan Yusen Lighting Technology Co., Ltd., Zhongshan City (CN)

(72) Inventor: Jianquan Lu, Zhongshan City (CN)

(73) Assignee: Zhongshan Yusen Lighting Technology Co., Ltd., Zhongshan (CN)

( * ) Notice: Subject to any disclaimer, the term of this patent is extended or adjusted under 35 U.S.C. 154(b) by 0 days.

(21) Appl. No.: 19/336,352

(22) Filed: Sep. 22, 2025

(30) Foreign Application Priority Data

Jul. 14, 2025 (CN) ......................... 202521475672.8

(51) Int. Cl.

| | |
|---|---|
| ***F21V 17/16*** | (2006.01) |
| ***F21S 6/00*** | (2006.01) |
| ***F21S 9/03*** | (2006.01) |
| ***F21V 3/02*** | (2006.01) |
| ***F21V 17/12*** | (2006.01) |
| ***F21V 23/00*** | (2015.01) |

(Continued)

(52) U.S. Cl.

CPC ............ *F21V 17/164* (2013.01); *F21S 6/005* (2013.01); *F21S 9/037* (2013.01); *F21V 3/02* (2013.01); *F21V 17/12* (2013.01); *F21V 23/002* (2013.01); *F21V 23/023* (2013.01); *F21V 23/06* (2013.01); *F21W 2121/00* (2013.01); *F21W 2131/109* (2013.01); *F21Y 2115/10* (2016.08)

(58) Field of Classification Search

CPC .... F21W 2131/109; F21S 6/005; F21S 6/008; F21S 6/007; F21S 8/083; F21S 8/081; F21S 8/08; F21S 9/037; F21V 3/02; F21V 17/12; F21V 17/164; F21V 23/002; F21V 23/023; F21V 23/06; F21V 2121/00; F21Y 2115/10

See application file for complete search history.

(56) References Cited

U.S. PATENT DOCUMENTS

2012/0069581 A1* 3/2012 Chen ......................... F21V 3/04
156/299

FOREIGN PATENT DOCUMENTS

JP 3154164 U * 10/2009 .............. F21V 21/30
WO WO-2019080714 A1 * 5/2019 ............ F21V 29/763

* cited by examiner

*Primary Examiner* — Anabel Ton

(57) ABSTRACT

The present disclosure discloses a luminaire with detachable decorative parts, including a translucent lamp shade and a light-emitting lamp assembly disposed on the translucent lamp shade, where an outer periphery of the translucent lamp shade is provided with a connection portion; the luminaire with detachable decorative parts further includes a light-transmitting decorative member detachably connectable to the connection portion; the luminaire with detachable decorative parts of the present disclosure achieves detachable connection through the engagement between the light-transmitting decorative member and the connection portion on the translucent lamp shade, realizing the effect of detachable light-transmitting decorative members, allowing users to replace different light-transmitting decorative members according to personal preferences or different occasion requirements, thereby achieving diversification and personalization of the luminaire's appearance; additionally, it may reduce packaging volume by detaching the light-transmitting decorative members, facilitating logistics transportation while lowering logistics costs.

9 Claims, 11 Drawing Sheets

(51) Int. Cl.

| | |
|---|---|
| ***F21V 23/02*** | (2006.01) |
| ***F21V 23/06*** | (2006.01) |
| *F21W 121/00* | (2006.01) |
| *F21W 131/109* | (2006.01) |
| *F21Y 115/10* | (2016.01) |

LUMINAIRE WITH DETACHABLE DECORATIVE PARTS

CROSS REFERENCE TO RELATED APPLICATIONS

The present disclosure claims the priority of Chinese Patent Application No. 2025214756728 filed on Jul. 14, 2025 before CNIPA. All the above are hereby incorporated by reference in their entirety.

TECHNICAL FIELD

The present disclosure relates to the technical field of luminaires, and particularly to a luminaire with detachable decorative parts.

BACKGROUND

In the field of modern lighting, the design and functionality of luminaires have become increasingly diverse to meet the requirements of different occasions and aesthetic preferences, such as solar ground lights, solar wall lights, solar floodlights, and solar lawn lights.

Solar lawn lights convert solar energy into electrical energy during daytime and store it in rechargeable batteries, automatically illuminating when night falls. Due to their outstanding features such as energy efficiency, environmental friendliness, safety, and aesthetic appeal, they are widely used in various landscape lighting applications including park lawns, garden villas, plaza green spaces, tourist attractions, resorts, golf courses, corporate factory green belts, and residential community green areas.

Currently, solar lawn lights available on the market typically consist of a translucent lamp shade, a solar light-emitting assembly, an energy storage and supply unit, and a ground stake. However, the appearance and decorative features of existing translucent lamp shades are relatively fixed, making it difficult to adapt to different decoration styles and personal preferences. Additionally, they are not convenient for disassembly and transportation to reduce logistics costs. In view of this, there is an urgent need for professionals in the field to develop a luminaire with detachable decorative components to meet more practical usage requirements.

SUMMARY

A primary objective of the present disclosure is to provide a luminaire with detachable decorative parts, aiming to address the aforementioned technical issues.

A luminaire with detachable decorative parts includes a translucent lamp shade and a light-emitting lamp assembly disposed on the translucent lamp shade, where an outer periphery of the translucent lamp shade is provided with a connection portion;

the luminaire with detachable decorative parts further includes a light-transmitting decorative member detachably connectable to the connection portion.

According to the aforementioned luminaire with detachable decorative parts, the connection portion is provided with a connection snap-fit slot, and further provided with an upper concave limiting slot located above the connection snap-fit slot and communicating with the connection snap-fit slot;

the light-transmitting decorative member is provided with a snap-fit rib portion adaptably connectable to the connection snap-fit slot, and further provided with an upper insertion portion integrally formed on an upper side of the snap-fit rib portion and insertable into the upper concave limiting slot;

the luminaire with detachable decorative parts further includes a connection limiting member detachably connected to a lower side of the translucent lamp shade for limiting a lower side of the snap-fit rib portion.

According to the aforementioned luminaire with detachable decorative parts, a lower side inside the connection snap-fit slot is provided with an inwardly recessed concave position;

a lower side of the snap-fit rib portion is provided with a lower snap-fit portion adaptably engageable inside the concave position.

According to the aforementioned luminaire with detachable decorative parts, a lower side inside the connection snap-fit slot is further provided with a lower extension portion extending downward outside the concave position, the lower extension portion being provided with a snap-fit opening;

the lower snap-fit portion is provided with a snap-fit protrusion adaptably engageable with the snap-fit opening.

According to the aforementioned luminaire with detachable decorative parts, an amount of the connection portions is two, arranged bilaterally symmetrically;

an amount of the light-transmitting decorative members is two, arranged bilaterally symmetrically.

According to the aforementioned luminaire with detachable decorative parts, the light-transmitting decorative member is shaped as a half butterfly wing.

According to the aforementioned luminaire with detachable decorative parts, an upper side of the translucent lamp shade is provided with a downwardly recessed mounting recess, and further provided with an intermediate cavity located below the mounting recess, and further provided with a connection opening located below the intermediate cavity and communicating with the intermediate cavity;

the light-emitting lamp assembly is disposed in the mounting recess;

the luminaire with detachable decorative parts further comprises:

a connection conductive assembly, disposed in the connection opening, and extending upward through the connection opening and the intermediate cavity to connect with the light-emitting lamp assembly;

an energy storage and supply assembly, disposed on the connection limiting member, and connectable with the connection conductive assembly.

According to the aforementioned luminaire with detachable decorative parts, the light-emitting lamp assembly includes:

a solar panel, disposed in the mounting recess;

a printed circuit board, disposed below the solar panel and connected to the solar panel;

an LED lamp bead, disposed on the printed circuit board, configured to emit light when energized;

a reflector cup, disposed below the solar panel, located outside the printed circuit board, and penetrated by the LED lamp bead;

the connection conductive assembly includes:

a conductive plate, disposed in the connection opening;

a connecting wire assembly, where a lower end thereof is connected to the conductive plate, and an upper end thereof extends upward and passes through the reflector cup to connect with the printed circuit board;

the connection limiting member is provided with a placement cavity penetrating vertically;

the energy storage and supply assembly includes:

an energy storage and supply battery, disposed inside the placement cavity;

a conductive spring, where a lower end thereof is disposed below the energy storage and supply battery, and an upper end thereof extends upward and is hooked on an upper side wall of the connection limiting member for electrical connection with the conductive plate.

According to the aforementioned luminaire with detachable decorative parts, the connection portion is a snap-fit opening;

the light-transmitting decorative member is provided with an insertion connection portion insertable into the snap-fit opening.

According to the aforementioned luminaire with detachable decorative parts, an inner side wall of the snap-fit opening is provided with a snap-fit annular groove;

the insertion connection portion is provided with an annular protrusion adaptably connectable with the snap-fit annular groove.

Compared with the prior art, the above disclosure has the following advantages:

The luminaire with detachable decorative parts of the present disclosure achieves detachable connection through the engagement between the light-transmitting decorative member and the connection portion on the translucent lamp shade, realizing the effect of detachable light-transmitting decorative members. This allows users to replace different light-transmitting decorative members according to personal preferences or different occasion requirements, thereby achieving diversification and personalization of the luminaire's appearance. Additionally, the packaging volume may be reduced by detaching the light-transmitting decorative members, facilitating logistics transportation while lowering logistics costs, thereby further enhancing the overall competitiveness of the luminaire with detachable decorative parts of the present disclosure.

BRIEF DESCRIPTION OF THE DRAWINGS

In order to illustrate the technical solutions of the embodiments of the present disclosure or of the prior art more clearly, the following drawings are briefly described as required in the context of the embodiments or the prior art. Obviously, the some following drawings illustrate only some of the embodiments of the present disclosure. Other relevant drawings may be obtained on the basis of These drawings without any creative effort by those skilled in the art.

DETAILED DESCRIPTION

Figure 1:
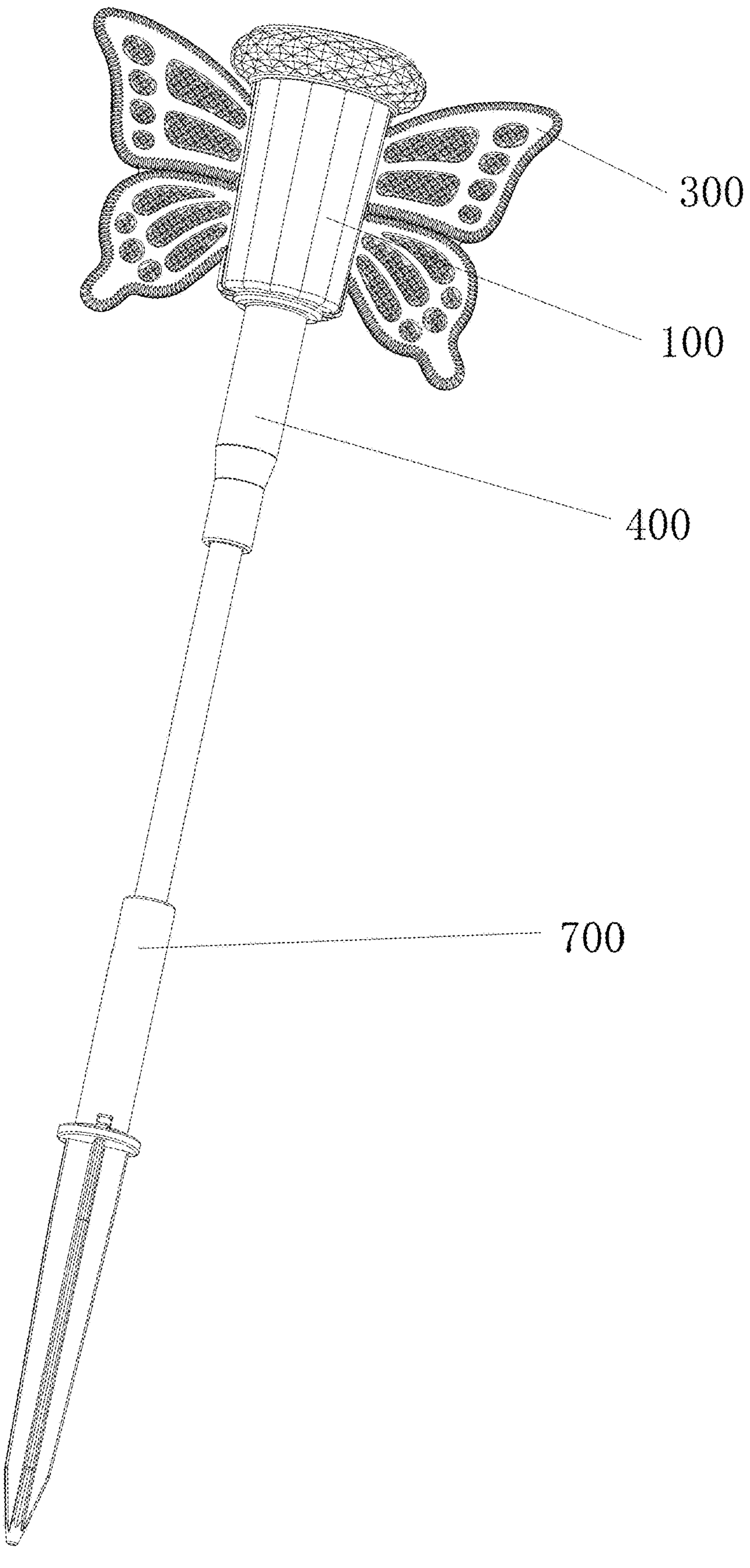
FIG. 1 is a perspective view of Embodiment 1 of the luminaire with detachable decorative parts of the present disclosure.
Figure 2:
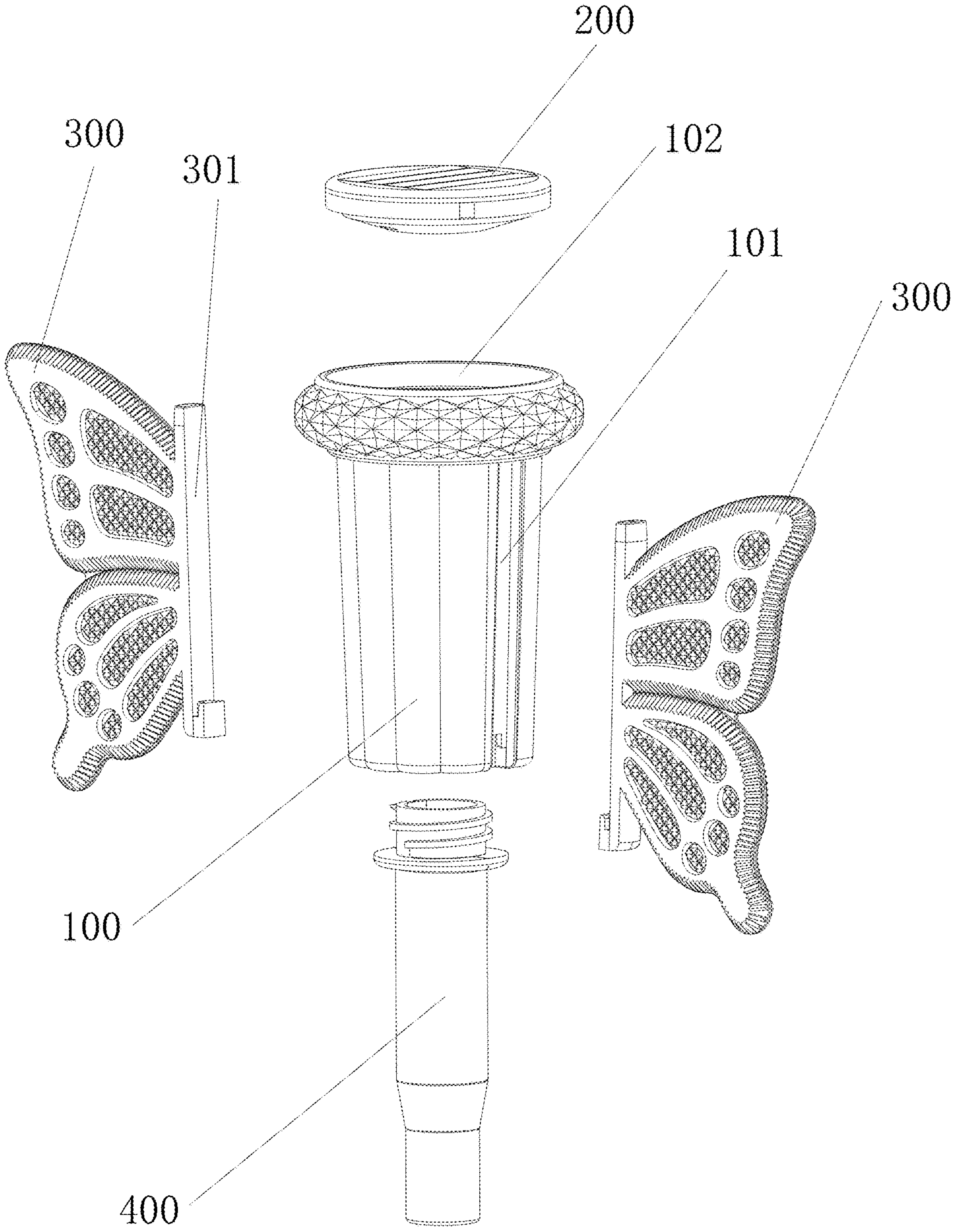
FIG. 2 is a partially exploded view of Embodiment 1 of the luminaire with detachable decorative parts of the present disclosure with the ground stake hidden.
Figure 3:
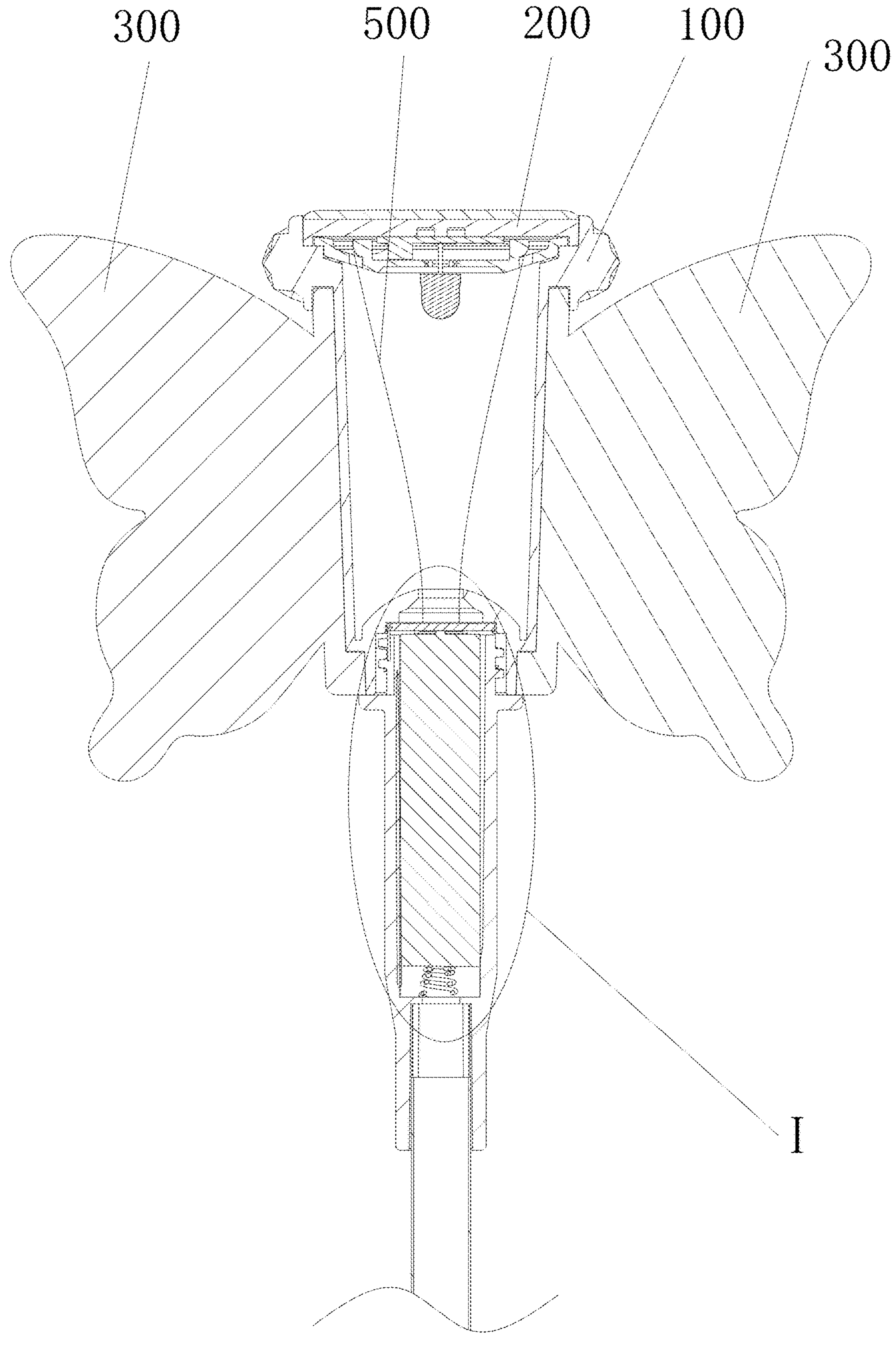
FIG. 3 is a partial cross-sectional view of Embodiment 1 of the luminaire with detachable decorative parts of the present disclosure.
Figure 4:
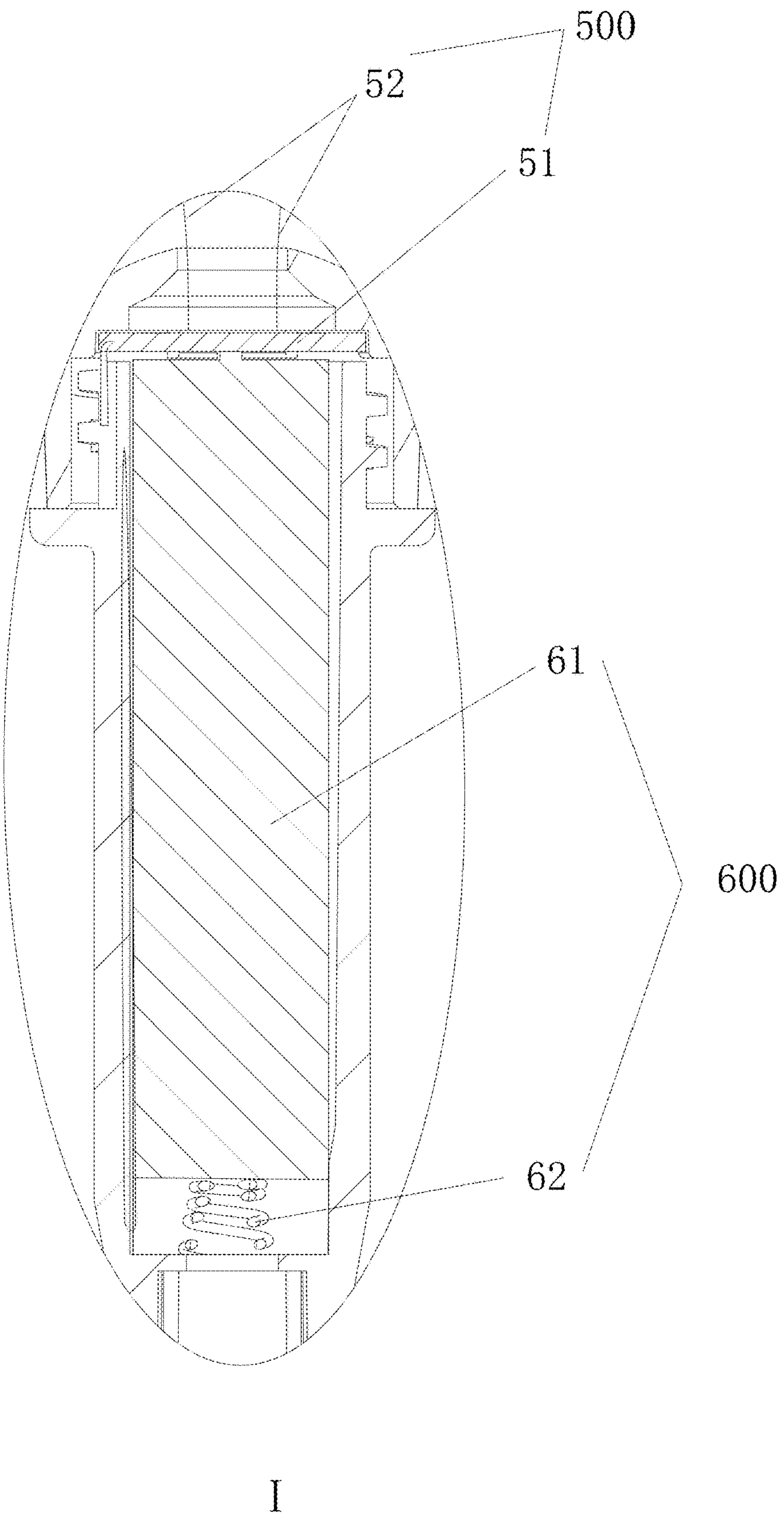
FIG. 4 is a partial enlarged view I of FIG. 3.
Figure 5:
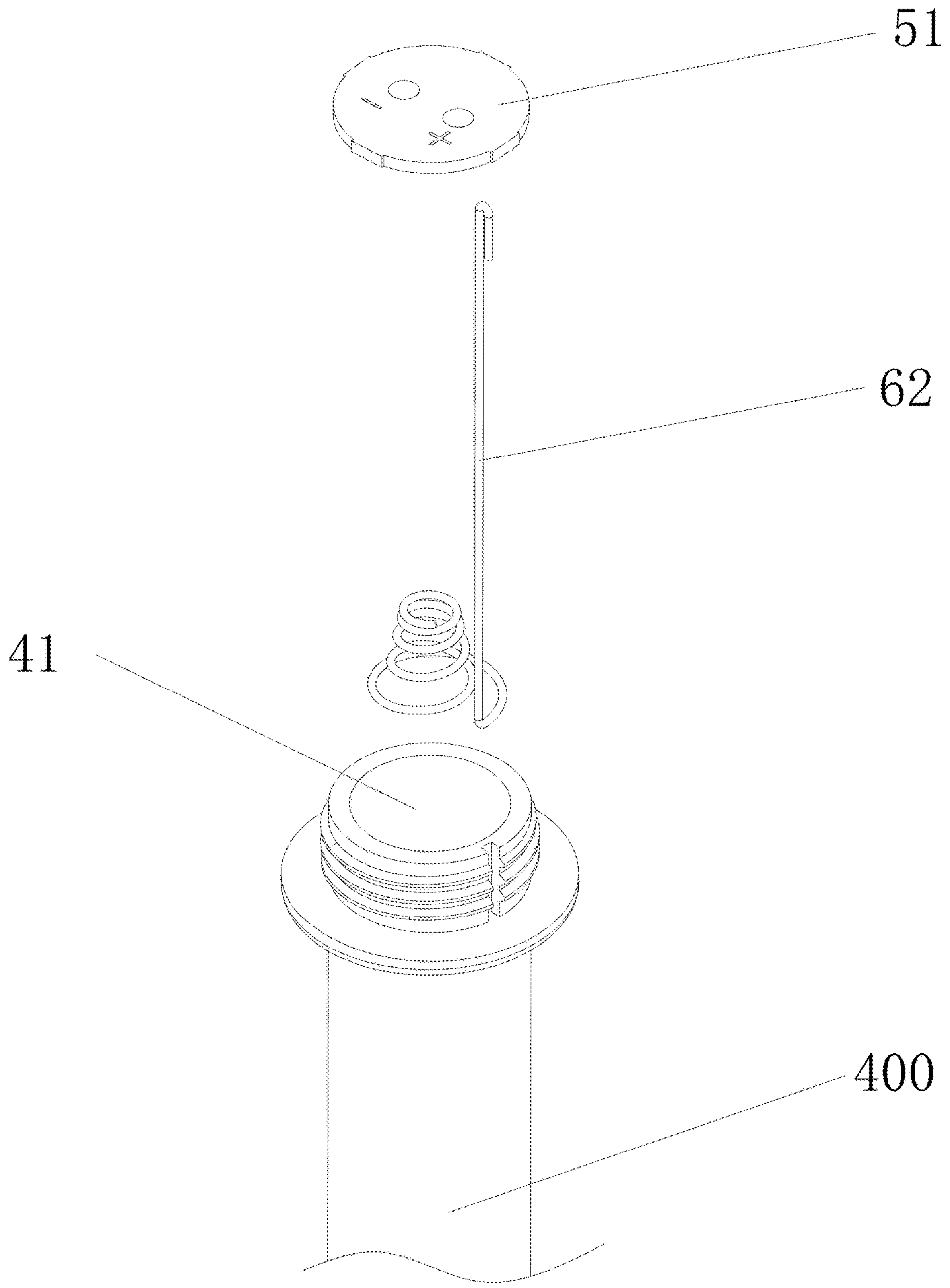
FIG. 5 is an exploded view of the conductive plate, conductive spring, and connection limiting member in Embodiment 1 of the luminaire with detachable decorative parts of the present disclosure.
Figure 6:
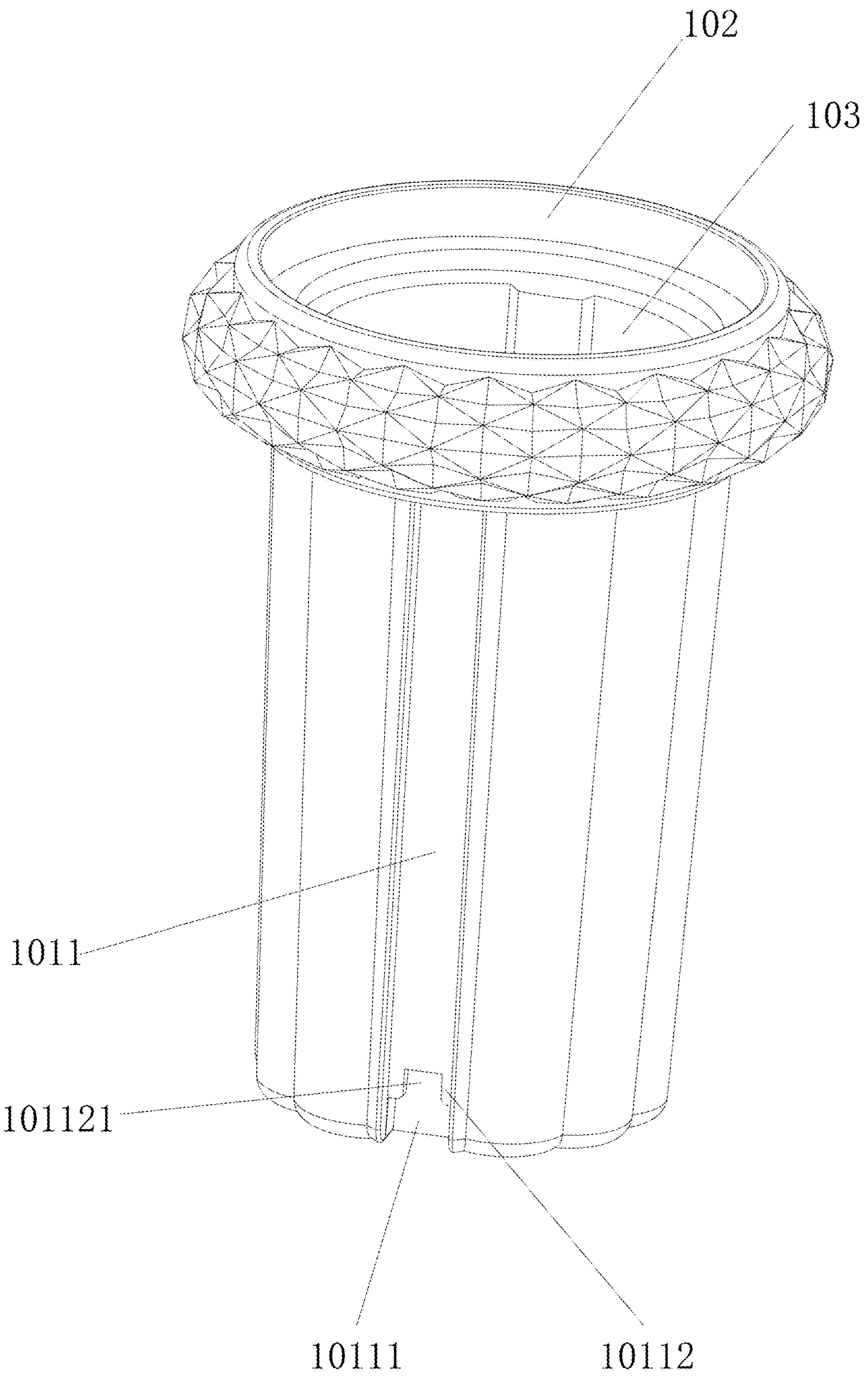
FIG. 6 is a perspective view of the translucent lamp shade in Embodiment 1 of the luminaire with detachable decorative parts of the present disclosure.
Figure 7:
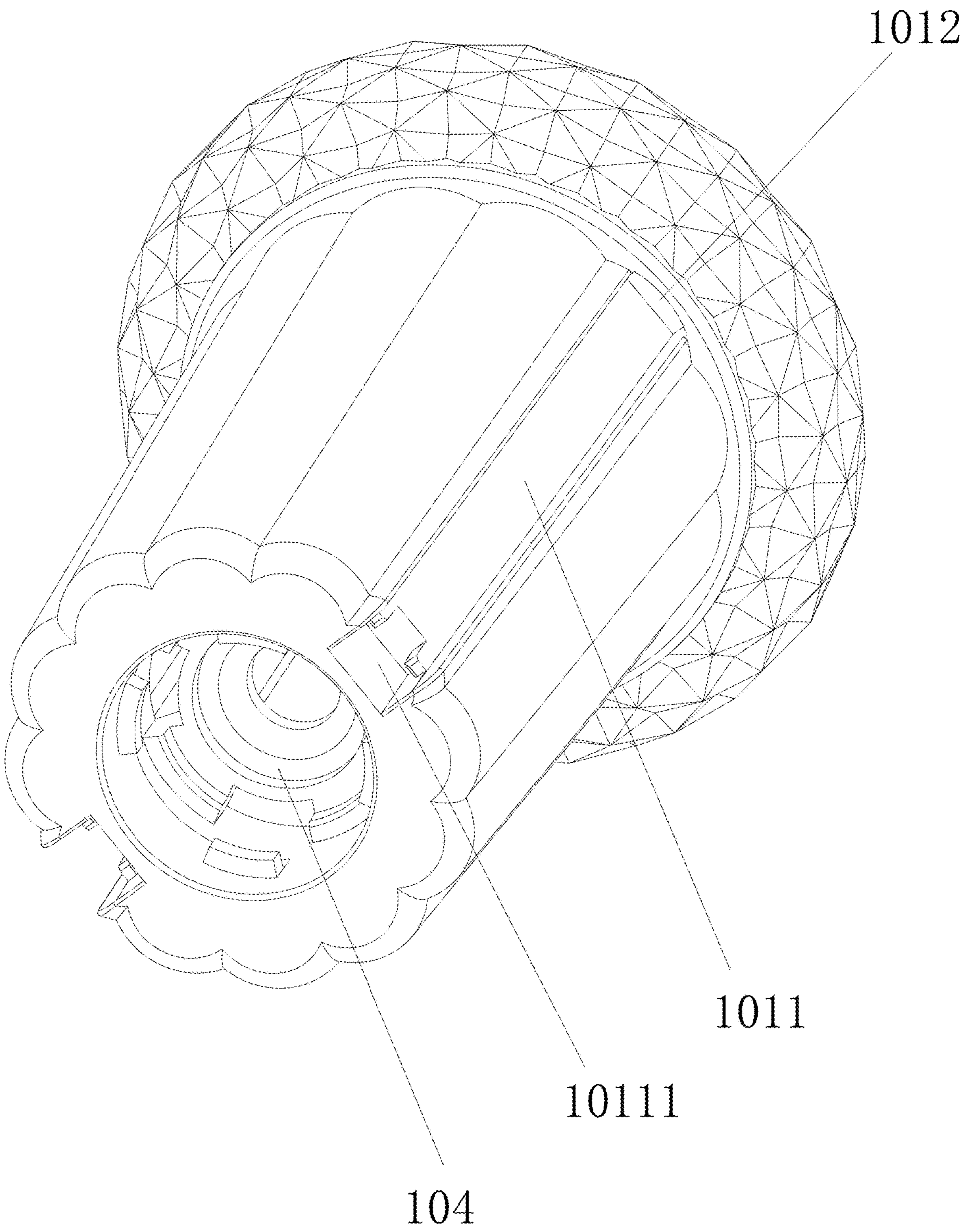
FIG. 7 is another perspective view of the translucent lamp shade in Embodiment 1 of the luminaire with detachable decorative parts of the present disclosure.
Figure 8:
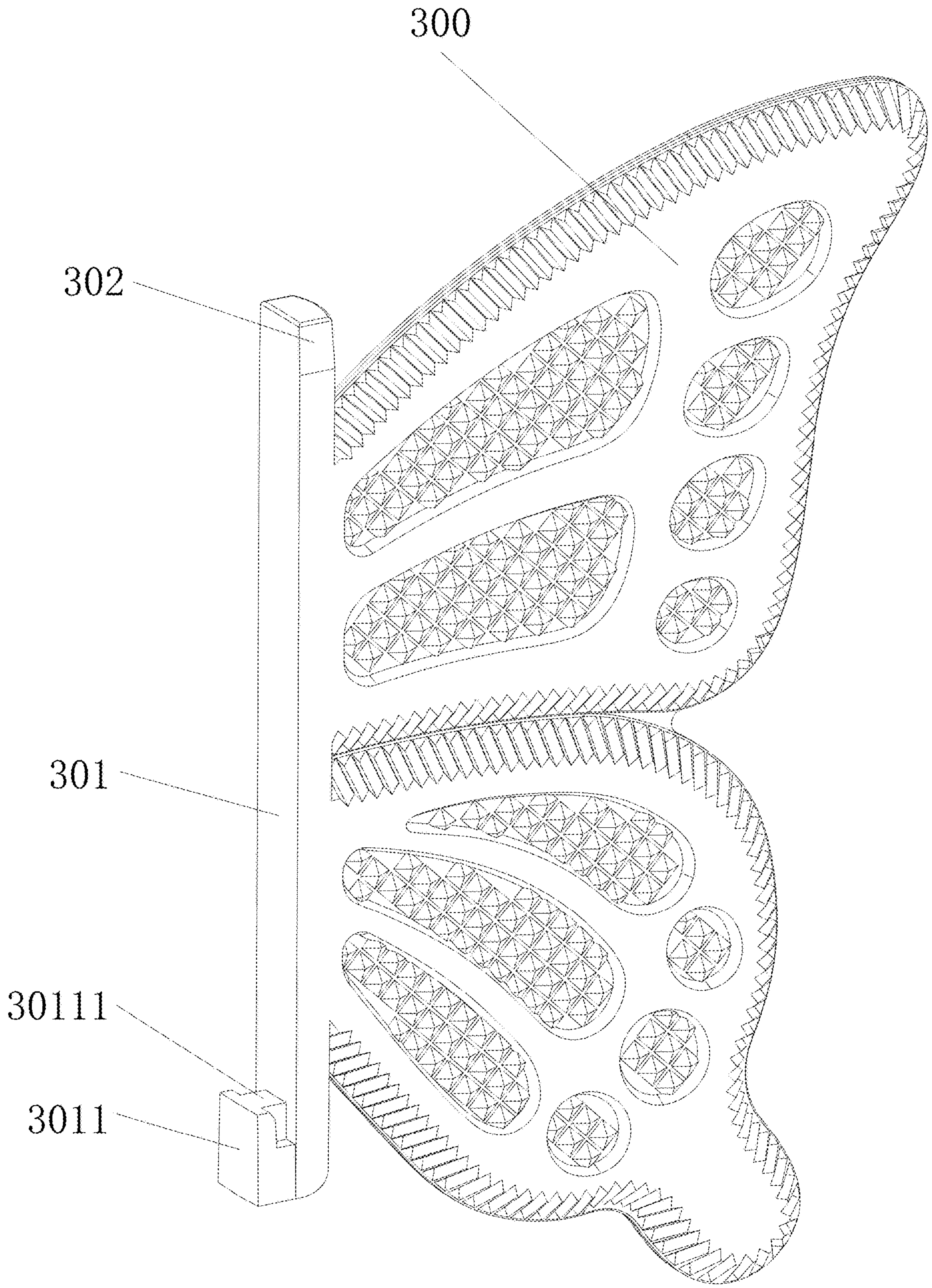
FIG. 8 is a perspective view of the light-transmitting decorative member in Embodiment 1 of the luminaire with detachable decorative parts of the present disclosure.
Figure 9:
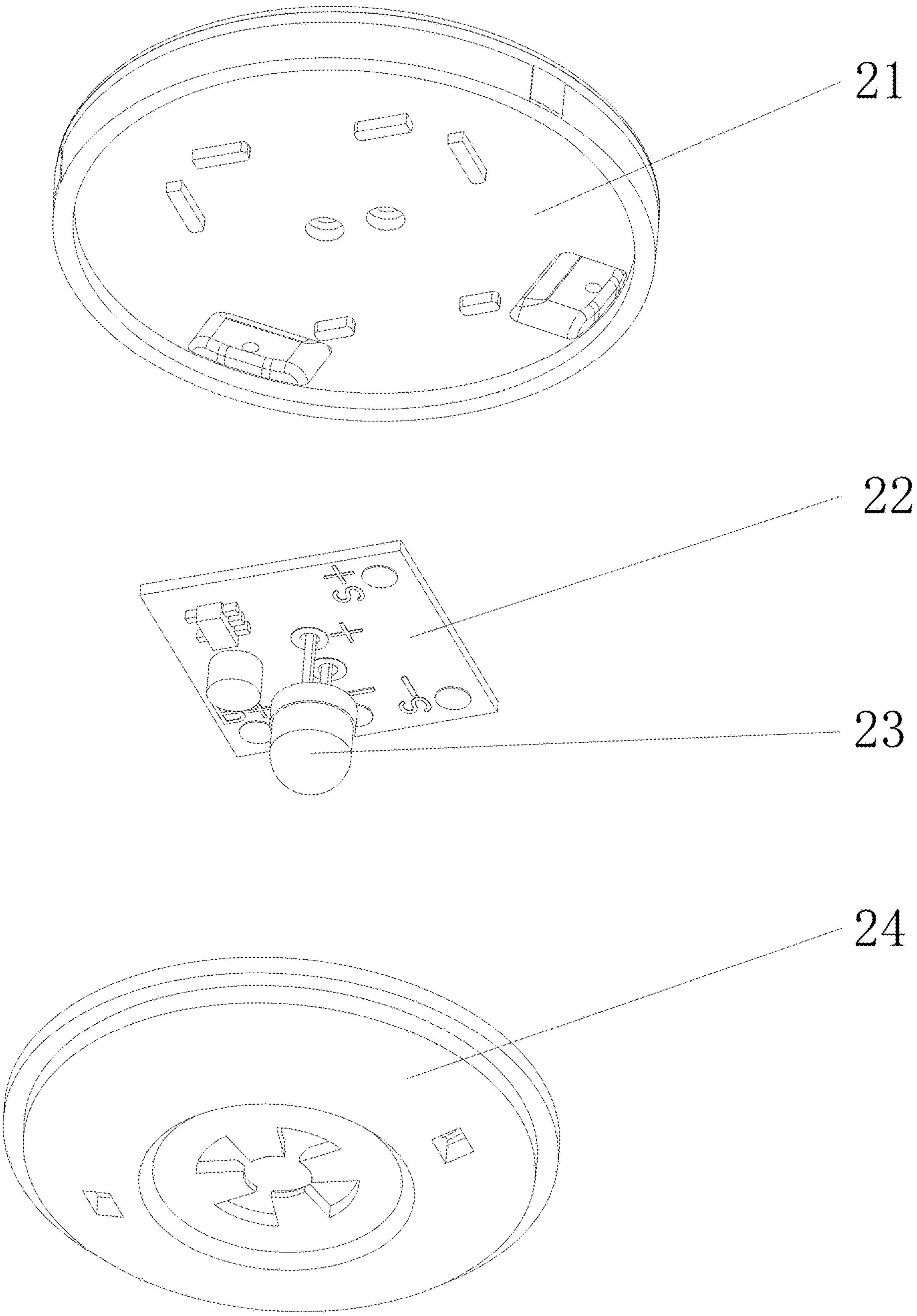
FIG. 9 is a partially exploded view of the light-emitting lamp assembly in Embodiment 1 of the luminaire with detachable decorative parts of the present disclosure.

The technical solutions in the embodiments of the present disclosure are clearly and completely described and discussed below in conjunction with the attached drawings of the embodiments of the present disclosure. Obviously, the embodiments described herein are only some of the embodiments of the present disclosure but not all of them. Based on the Published in the present disclosure, all other embodiments obtained by those skilled in the art without creative efforts fall within the scope of protection of the present disclosure.

It should be noted that all directional indications (such as up, down, left, right, front, back, etc.) in the embodiments of the present disclosure are only used to explain the relative positional relationships, movement conditions, etc., between various components in a specific orientation (as shown in the accompanying drawings). If this specific orientation changes, the directional indications will change accordingly.

Furthermore, the descriptions involving "first", "second", etc., in the present disclosure are for descriptive purposes only and may not be understood as indicating or implying relative importance or implicitly specifying the quantity of the indicated technical features. As a result, a feature defined as "first" or "second" may expressly or implicitly include one or more such features. Moreover, technical solutions between various embodiments may be combined with each other, but this should be based on the ability of a person of ordinary skill in the art to implement them. When the combination of technical solutions results in mutual contradiction or impossibility of implementation, it should be considered that such a combination of technical solutions does not exist and is not within the scope of protection claimed in the present disclosure.

Embodiment 1

As shown in FIGS. 1 to 9, a luminaire with detachable decorative parts includes a translucent lamp shade 100 and a light-emitting lamp assembly 200 disposed on the translucent lamp shade 100. An outer periphery of the translucent lamp shade 100 is provided with a connection portion 101.

The luminaire with detachable decorative parts further includes a light-transmitting decorative member 300 detachably connectable to the connection portion 101.

The luminaire with detachable decorative parts of the present disclosure achieves detachable connection through the engagement between the light-transmitting decorative member 300 and the connection portion 101 on the translucent lamp shade 100, realizing the effect of detachable light-transmitting decorative members 300. This allows users to replace different light-transmitting decorative members 300 according to personal preferences or different occasion requirements, thereby achieving diversification and personalization of the luminaire's appearance. Additionally, the packaging volume can be reduced by detaching the light-transmitting decorative members 300, facilitating logistics transportation while lowering logistics costs, thereby further enhancing the overall competitiveness of the luminaire with detachable decorative parts of the present disclosure.

Furthermore, the connection portion 101 is provided with a connection snap-fit slot 1011, and further provided with an upper concave limiting slot 1012 located above the connection snap-fit slot 1011 and communicating with the connection snap-fit slot 1011.

The light-transmitting decorative member 300 is provided with a snap-fit rib portion 301 adaptably connectable to the connection snap-fit slot 1011, and further provided with an upper insertion portion 302 integrally formed on an upper side of the snap-fit rib portion 301 and insertable into the upper concave limiting slot 1012. The present disclosure ensures initial connection between the light-transmitting decorative member 300 and the translucent lamp shade 100 through the adaptable connection between the snap-fit rib portion 301 and the connection snap-fit slot 1011, followed by inserting the upper insertion portion 302 integrally formed on the upper side of the snap-fit rib portion 301 into the upper concave limiting slot 1012, further enhancing the connection strength and stability between the light-transmitting decorative member 300 and the translucent lamp shade 100.

The luminaire with detachable decorative parts further includes a connection limiting member 400 detachably connected to a lower side of the translucent lamp shade 100 for limiting a lower side of the snap-fit rib portion 301. The present disclosure adopts the arrangement of the connection limiting member 400, the purpose of which is to prevent the light-transmitting decorative member 300 from detaching from the translucent lamp shade 100, thereby improving the reliability and safety of the overall structure.

Furthermore, a lower side inside the connection snap-fit slot 1011 is provided with an inwardly recessed concave position 10111, causing the connection snap-fit slot 1011 to exhibit an L-shape;

a lower side of the snap-fit rib portion 301 is provided with a lower snap-fit portion 3011 adaptably engageable inside the concave position 10111.

The purpose of the adaptable engagement between the lower snap-fit portion 3011 and the concave position 10111 in the present disclosure is to inwardly extend the limiting distance that may be constrained by the connection limiting member 400, thereby allowing reduction of the radial dimension of the connection limiting member 400 to minimize its obstructive effect on the bottom of the translucent lamp shade 100. This further enhances the overall light transmission effect of the translucent lamp shade 100 while also contributing to improved stability of the connection for the light-transmitting decorative member 300.

Moreover, a lower side inside the connection snap-fit slot 1011 is further provided with a lower extension portion 10112 extending downward outside the concave position 10111, the lower extension portion 10112 being provided with a snap-fit opening 101121;

the lower snap-fit portion 3011 is provided with a snap-fit protrusion 30111 adaptably engageable with the snap-fit opening 101121. The purpose of the adaptable engagement between the snap-fit protrusion 30111 and the snap-fit opening 101121 in the present disclosure is to further enhance the tightness of installation for the light-transmitting decorative member 300, facilitating practical assembly and use.

Furthermore, an amount of the connection portions 101 is two, arranged bilaterally symmetrically; an amount of the light-transmitting decorative members 300 is two, arranged bilaterally symmetrically. The light-transmitting decorative member 300 is shaped as a half butterfly wing. The purpose thereof is to imitate a butterfly shape, presenting a bionic butterfly design, thereby further enhancing the overall aesthetic appeal and ornamental value of the present disclosure.

Certainly, the shape of the light-transmitting decorative member 300 may also be other shapes and is not limited to a half butterfly wing shape.

Furthermore, an upper side of the translucent lamp shade 100 is provided with a downwardly recessed mounting recess 102, and further provided with an intermediate cavity 103 located below the mounting recess 102, and further provided with a connection opening 104 located below the intermediate cavity 103 and communicating with the intermediate cavity 103;

the light-emitting lamp assembly 200 is disposed in the mounting recess 102;

the luminaire with detachable decorative parts further includes a connection conductive assembly 500 and an energy storage and supply assembly 600.

The connection conductive assembly 500 is disposed in the connection opening 104, and extends upward through the connection opening 104 and the intermediate cavity 103 to connect with the light-emitting lamp assembly 200;

the energy storage and supply assembly 600 is disposed on the connection limiting member 400, and is connectable with the connection conductive assembly 500.

The light-emitting lamp assembly 200 includes a solar panel 21, a printed circuit board 22, an LED lamp bead 23, and a reflector cup 24.

The solar panel 21 is disposed in the mounting recess 102. The printed circuit board 22 is disposed below the solar panel 21 and is connected to the solar panel 21. The LED lamp bead 23 is disposed on the printed circuit board 22 for emitting light when energized; the reflector cup 24 is disposed below the solar panel 21, located outside the printed circuit board 22, and is penetrated by the LED lamp bead 23.

The connection conductive assembly 500 includes a conductive plate 51 and a connecting wire assembly 52.

The conductive plate 51 is disposed in the connection opening 104. A lower end of the connecting wire assembly 52 is connected to the conductive plate 51, and an upper end thereof extends upward and passes through the reflector cup 24 to connect with the printed circuit board 22.

The connection limiting member 400 is provided with a placement cavity 41 penetrating vertically.

The energy storage and supply assembly 600 includes an energy storage and supply battery 61 and a conductive spring 62. The energy storage and supply battery 61 is disposed inside the placement cavity 41; a lower end of the conductive spring 62 is disposed below the energy storage and supply battery 61, and an upper end thereof extends upward and is hooked on an upper side wall of the connection limiting member 400 for electrical connection with the conductive plate 51.

The present disclosure positions the light-emitting lamp assembly 200 on the upper side of the translucent lamp shade 100 and the energy storage and supply assembly 600 inside the connection limiting member 400, with the connection conductive assembly 500 on the translucent lamp shade 100 serving as an intermediate conductive connection. This achieves ingenious utilization of upper, middle, and lower spatial layers, thereby further enhancing the overall lighting effect of the luminaire.

Furthermore, the connecting wire assembly 52 includes positive and negative connection leads, both of which are silver wires or silver-plated wires, preferably silver wires. The advantage lies in achieving a hidden wire connection effect under illuminated conditions, thereby maximizing the overall lighting effect of the luminaire.

Furthermore, the luminaire with detachable decorative parts further includes a connection ground stake 700 detachably connected to a lower side of the connection limiting member 400, the purpose of which is to facilitate the use requirement of inserting the entire luminaire into the lawn.

Embodiment 2

Figure 10:
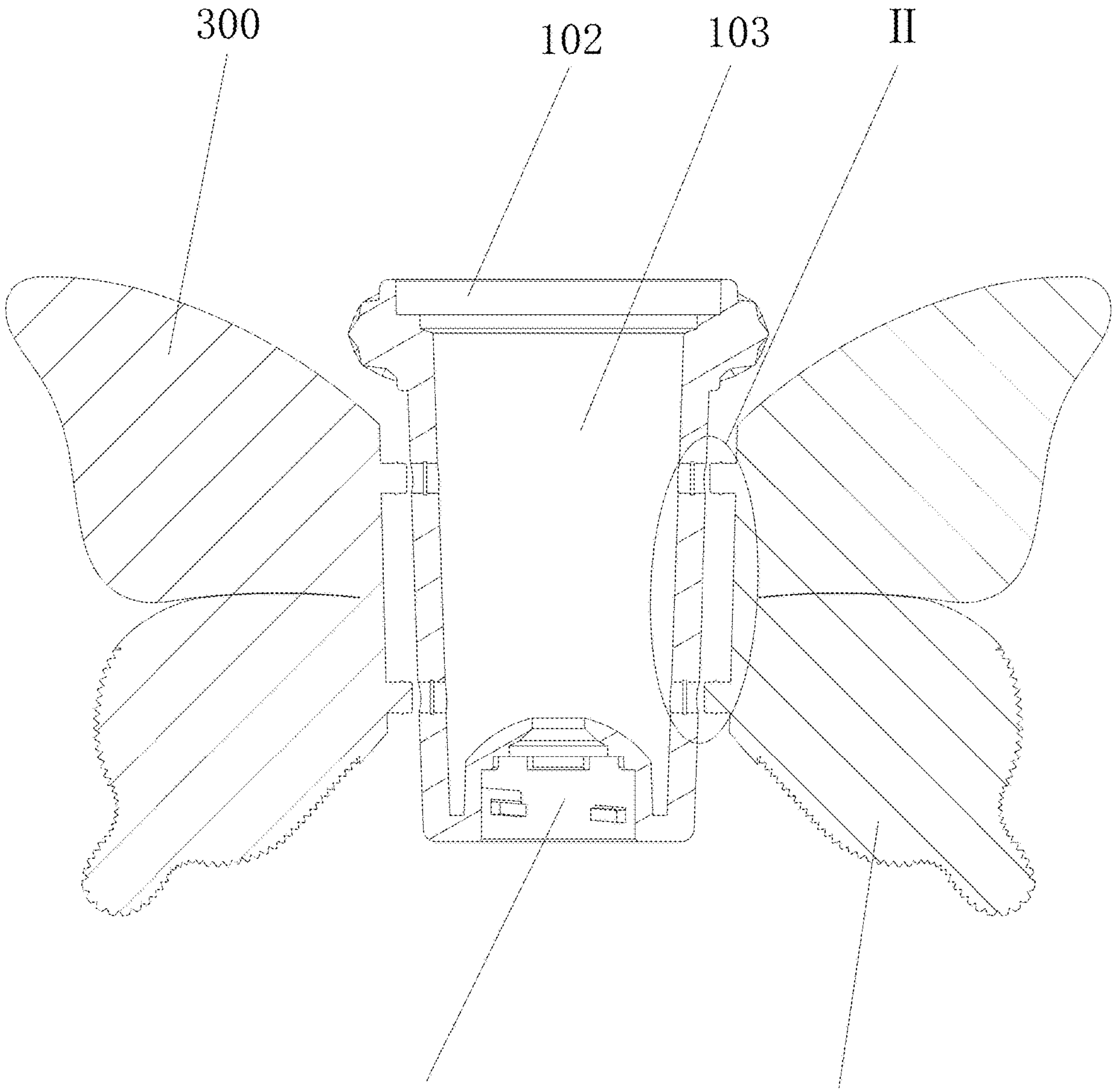
FIG. 10 is a schematic cross-sectional view of Embodiment 2 of the luminaire with detachable decorative parts of the present disclosure.
Figure 11:
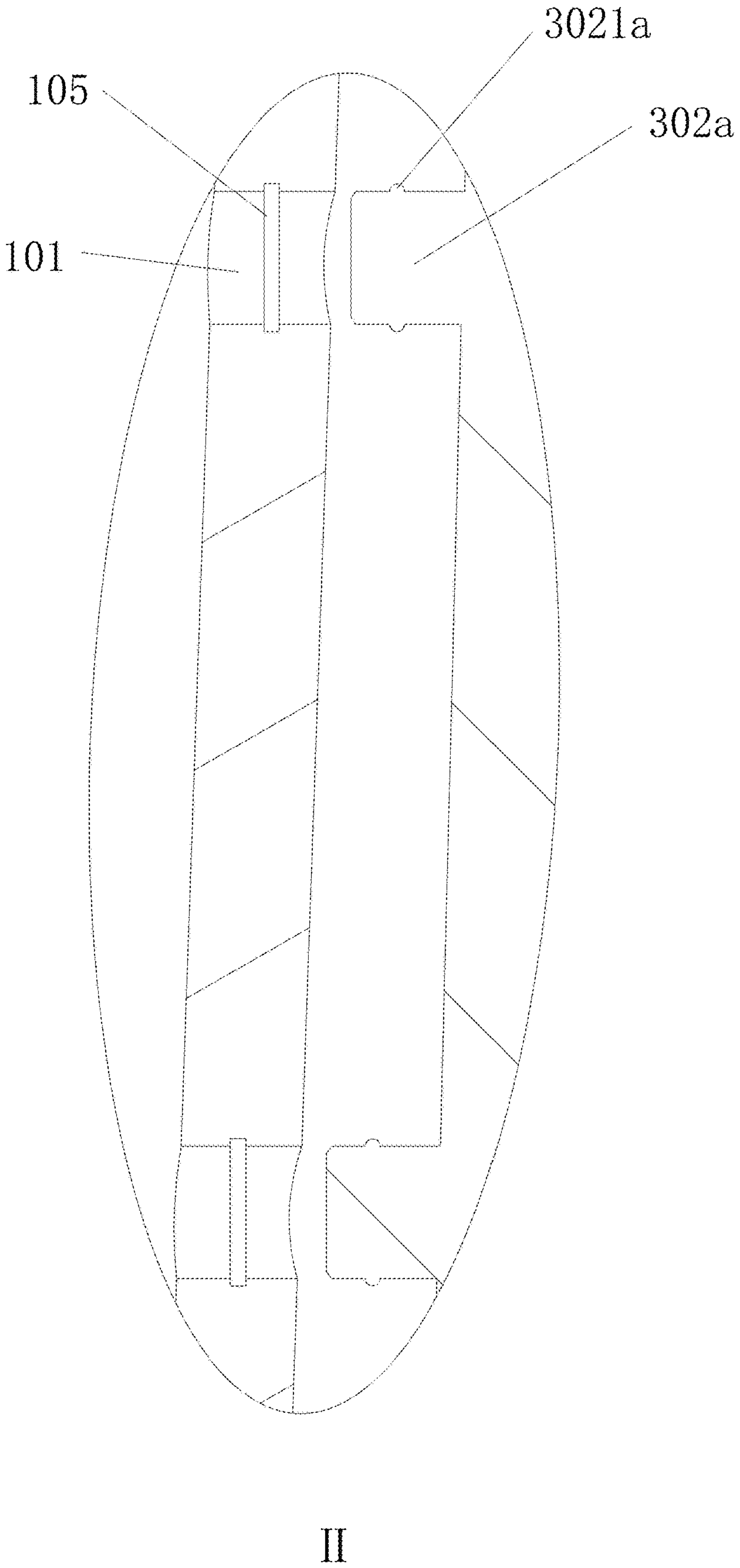
FIG. 11 is a partial enlarged view II of FIG. 10.

As shown in FIGS. 10 to 11, the difference between this embodiment and Embodiment 1 is only that:

the connection portion 101 is a snap-fit opening, an amount of snap-fit openings is four, arranged in two pairs with upper and lower spacing and bilateral symmetry, and an inner side wall of each snap-fit opening is provided with a snap-fit annular groove 105; the light-transmitting decorative member 300 is provided with an insertion connection portion 302*a* insertable into the snap-fit opening, and the insertion connection portion 302*a* is provided with an annular protrusion 3021*a* adaptably connectable with the snap-fit annular groove 105. The advantage lies in its simple disassembly and assembly structure, providing another implementation method for the detachable structure of the light-transmitting decorative member 300 of the present disclosure.

The above descriptions represent one implementation provided in conjunction with specific content and are not intended to limit the scope of specific implementations of the present disclosure. Any structures or methods approximating or resembling the present disclosure, or involving any quantity of technical deductions or substitutions made under the premise of the inventive concept, should be considered within the scope of protection of the present disclosure.

What is claimed is:

1. A luminaire with detachable decorative parts, comprising a translucent lamp shade and a light-emitting lamp assembly disposed on the translucent lamp shade, wherein an outer periphery of the translucent lamp shade is provided with a connection portion;

wherein the luminaire with detachable decorative parts further comprises a light-transmitting decorative member detachably connectable to the connection portion-, wherein the connection portion is provided with a connection snap-fit slot, and further provided with an upper concave limiting slot located above the connection snap-fit slot and communicating with the connection snap-fit slot;

the light-transmitting decorative member is provided with a snap-fit rib portion adaptably connectable to the connection snap-fit slot, and further provided with an upper insertion portion integrally formed on an upper side of the snap-fit rib portion and insertable into the upper concave limiting slot;

the luminaire with detachable decorative parts further comprises a connection limiting member detachably connected to a lower side of the translucent lamp shade for limiting a lower side of the snap-fit rib portion.

2. The luminaire with detachable decorative parts according to claim 1, wherein a lower side inside the connection snap-fit slot is provided with an inwardly recessed concave position;

a lower side of the snap-fit rib portion is provided with a lower snap-fit portion adaptably engageable inside the concave position.

3. The luminaire with detachable decorative parts according to claim 2, wherein a lower side inside the connection snap-fit slot is further provided with a lower extension portion extending downward outside the concave position, the lower extension portion being provided with a snap-fit opening;

the lower snap-fit portion is provided with a snap-fit protrusion adaptably engageable with the snap-fit opening.

4. The luminaire with detachable decorative parts according to claim 3, wherein an amount of the connection portions is two, arranged bilaterally symmetrically;

an amount of the light-transmitting decorative members is two, arranged bilaterally symmetrically.

5. The luminaire with detachable decorative parts according to claim 4, wherein the light-transmitting decorative member is shaped as a half butterfly wing.

6. The luminaire with detachable decorative parts according to claim 1, wherein an upper side of the translucent lamp shade is provided with a downwardly recessed mounting recess, and further provided with an intermediate cavity located below the mounting recess, and further provided with a connection opening located below the intermediate cavity and communicating with the intermediate cavity;

the light-emitting lamp assembly is disposed in the mounting recess;

the luminaire with detachable decorative parts further comprises:

a connection conductive assembly, disposed in the connection opening, and extending upward through the connection opening and the intermediate cavity to connect with the light-emitting lamp assembly;

an energy storage and supply assembly, disposed on the connection limiting member, and connectable with the connection conductive assembly.

7. The luminaire with detachable decorative parts according to claim 6, wherein the light-emitting lamp assembly comprises:

a solar panel, disposed in the mounting recess;

a printed circuit board, disposed below the solar panel and connected to the solar panel;

an LED lamp bead, disposed on the printed circuit board, configured to emit light when energized;

a reflector cup, disposed below the solar panel, located outside the printed circuit board, and penetrated by the LED lamp bead;

the connection conductive assembly comprises:

a conductive plate, disposed in the connection opening;

a connecting wire assembly, wherein a lower end thereof is connected to the conductive plate, and an upper end thereof extends upward and passes through the reflector cup to connect with the printed circuit board;

the connection limiting member is provided with a placement cavity penetrating vertically;

the energy storage and supply assembly comprises:

an energy storage and supply battery, disposed inside the placement cavity;

a conductive spring, wherein a lower end thereof is disposed below the energy storage and supply battery, and an upper end thereof extends upward and is hooked on an upper side wall of the connection limiting member for electrical connection with the conductive plate.

8. A luminaire with detachable decorative parts, comprising a translucent lamp shade and a light-emitting lamp assembly disposed on the translucent lamp shade, wherein an outer periphery of the translucent lamp shade is provided with a connection portion; and a light-transmitting decorative member detachably connectable to the connection portion, wherein the connection portion is a snap-fit opening;

the light-transmitting decorative member is provided with an insertion connection portion insertable into the snap-fit opening.

9. The luminaire with detachable decorative parts according to claim 8, wherein an inner side wall of the snap-fit opening is provided with a snap-fit annular groove;

the insertion connection portion is provided with an annular protrusion adaptably connectable with the snap-fit annular groove.

* * * * *